United States Patent
Bauer et al.

(10) Patent No.: US 6,824,862 B2
(45) Date of Patent: Nov. 30, 2004

(54) FIBER-REINFORCED CERAMIC COMPOSITE

(75) Inventors: Moritz Bauer, Augsburg (DE); Georg Burkhart, Diedorf (DE); Martin Christ, Wehringen (DE); Ronald Huener, Baar (DE); Andreas Kienzle, Thierhaupten (DE); Peter Winkelmann, Thierhaupten (DE); Rainer Zimmermann-Chopin, Ellgau (DE)

(73) Assignee: SGL Carbon AG (DE)

( * ) Notice: Subject to any disclaimer, the term of this patent is extended or adjusted under 35 U.S.C. 154(b) by 30 days.

(21) Appl. No.: 10/328,417

(22) Filed: Dec. 23, 2002

(65) Prior Publication Data

US 2003/0134098 A1 Jul. 17, 2003

(30) Foreign Application Priority Data

Dec. 31, 2001 (DE) ......................................... 101 64 226

(51) Int. Cl.$^7$ ............................................. B32B 18/00
(52) U.S. Cl. ................................ 428/293.4; 428/312.6; 428/317.9; 428/446; 428/698; 428/408; 428/902; 428/697; 65/17.3; 65/17.6; 260/998.13; 501/95; 501/97.4; 501/92; 501/88; 501/90; 264/122; 264/29.6; 264/428; 264/658; 264/649
(58) Field of Search ......................... 428/312.6, 446, 428/698, 408, 697, 902, 293.4, 222, 41.7, 193, 220; 65/17.3, 17.6; 501/95, 97.4, 92, 88, 90, 95.2, 96.2; 264/122, 658, 428, 29.6, 646, 519, 87, 667

(56) References Cited

U.S. PATENT DOCUMENTS 4,885,199 A * 12/1989 Corbin et al. ............... 428/113
5,049,329 A * 9/1991 Allaire et al. ................ 264/570
5,177,039 A * 1/1993 Allaire et al. ............... 501/95.2
6,261,981 B1 * 7/2001 Dietrich et al. ............. 501/95.2
6,264,045 B1 * 7/2001 Wilson et al. ............... 210/491

FOREIGN PATENT DOCUMENTS

| DE | 44 38 455 C1 | 5/1996 | ............. C09K/3/14 |
|---|---|---|---|
| DE | 44 38 456 A1 | 5/1996 | ............ F16D/69/02 |
| DE | 197 10 105 A1 | 9/1998 | ............ C04B/35/83 |
| DE | 197 11 829 C1 | 10/1998 | ............ C04B/35/80 |
| DE | 198 56 721 A1 | 6/2000 | .......... C04B/35/577 |
| DE | 199 39 545 A1 | 2/2001 | ............ F16D/69/02 |
| DE | 101 57 583 C1 | 12/2002 | ............ F16D/69/02 |
| EP | 1 124 071 A1 | 8/2001 | ............ F16D/65/12 |
| EP | 1 124 074 A1 | 8/2001 | ............ F16D/69/02 |
| EP | 1 211 231 A1 | 6/2002 | .......... C04B/35/573 |
| FR | 2 781 852 A1 | 2/2000 | ............ F16D/69/02 |
| WO | WO 99/41069 A1 | 8/1999 | ............ B32B/18/00 |
| WO | WO 02/26659 A1 | 4/2002 | ............ C04B/37/00 |

* cited by examiner

Primary Examiner—Merrick Dixon
(74) Attorney, Agent, or Firm—Connelly Bove Lodge & Hutz LLP

(57) ABSTRACT

Fiber-reinforced ceramic composites contain bundles, tows or hanks of long fibers, wherein the long fiber bundles, tows or hanks are completely surrounded by a short fiber-reinforced matrix, with the long and short fibers having, independently of one another, a mean diameter of from 4 to 12 $\mu$m and the long fibers having a mean length of at least 50 mm and the short fibers having a mean length of not more than 40 mm, a process for producing them and their use for producing clutch disks or brake disks.

12 Claims, No Drawings

FIBER-REINFORCED CERAMIC COMPOSITE

FIELD OF THE INVENTION

The invention relates to fiber-reinforced ceramic composites. In particular, it also relates to axially symmetric components made of fiber-reinforced ceramic composites, in particular cylindrical disks, for example friction bodies.

BACKGROUND OF THE INVENTION

Carbon fiber-reinforced composites or ceramics, in particular those having an SiC-containing matrix, are of particular interest for the production of highly tribologically stressed materials as used, for example, for friction bodies such as brake disks and clutch disks. These materials have a high thermal stability, low wear and good tribological properties.

In DE-A 199 39 545, it is proposed to increase the stressability and performance compared to the prior art by using clutch disks with friction linings of carbon fiber-reinforced silicon carbide (SiC). No details are given regarding the precise nature of the material.

A disadvantage of this material is that the production of a dense SiC matrix having carbon fiber reinforcement can be achieved only with difficulty in industry. A major improvement is infiltration of carbon fiber-reinforced carbon-containing intermediate bodies with liquid silicon to give composites containing carbon fibers as reinforcing fibers and whose matrix comprises phases of metallic silicon and silicon carbide.

DE-C 44 38 455 discloses producing friction units, in particular brake and clutch bodies, composed of C/C—SiC (carbon fiber-reinforced materials whose matrix comprises silicon, silicon carbide and residual carbon) by infiltration of porous, carbon fiber-reinforced carbon bodies (C/C bodies) provided with hollow spaces and recesses with liquid silicon. However, the recesses and hollow spaces decrease the strength of the body. Studies have shown that even solid disks are unsuitable for high rotational speeds or rates of rotation of the disk, as occur, for example, in the case of clutch disks.

In EP-A 1124074 and EP-A 1124071 brake disks are disclosed which are composed of C/SiC (carbon fiber-reinforced ceramic composites whose matrix comprises silicon carbide) and methods of producing these in which, apart from a base material reinforced with bundles of short carbon fibers, long fibers are also provided for reinforcement. The long fibers extend around the shape of the brake disk. This is said to inhibit crack growth and increase the strength of the disk. The matrix material of these disks has a uniform composition, and this leads to a homogenous material composition of the finished part.

In the patent application DE 10157583.1 friction bodies are described composed of C/SiC which have a friction layer reinforced with long fibers aligned in the plane of the disk. The C/SiC surrounding the long fibers is, like the covering layer, reinforced with short fibers. The production process starts from inserts of long fiber bundles embedded in a pressable composition containing short fibers. The friction layer has a smaller proportion of short carbon fibers than the core zone.

Both of the abovementioned production methods are unsuitable for achieving high long fiber contents and a uniform long fiber distribution over the entire body. However, both are prerequisites for a further increase in strength under rotational stress.

It is therefore an object of the invention to provide fiber-reinforced ceramic composites for producing shaped bodies, in particular friction bodies, which have increased strength under rotational stress, in particular at high rates of rotation. A further object is to find a technically simple and inexpensive process for introducing the long fiber reinforcement. Another object is to provide a covering layer for these friction bodies which has been optimized in respect of the frictional and wear properties.

SUMMARY OF THE INVENTION

This object is achieved by a fiber-reinforced ceramic composite, in particular a C/SiC material, whith regions located in the interior of the shaped bodies produced therefrom reinforced with bundles, tows or hanks of fibers which are aligned essentially parallel to or concentric with the outer contour or circumference and completely surrounded by a short fiber-reinforced matrix, preferably C/SiC, and with a covering layer comprising a similar short fiber-reinforced matrix material having a lower fiber content, in particular a covering layer of C/SiC having a higher SiC content than the interior region. The reinforcing fibers, i.e. the short and long fibers, are selected independently of one another, from fibers having a mean diameter of from 4 to 12 $\mu$m, preferably from 5 to 10 $\mu$m and in particular from 6 to 8 $\mu$m. The reinforcing fibers are preferably carbon fibers.

The invention therefore provides fiber-reinforced ceramic composites comprising bundles, tows or hanks of fibers which are surrounded completely by a short fiber-reinforced matrix, with the long and short fibers being selected, independently of one another, from fibers having a mean diameter of from 4 to 12 $\mu$m.

Furthermore, the invention relates to shaped bodies comprising such materials, in particular friction bodies in the form of cylindrical disks or annular disks, which preferably also have at least one covering layer of a similar short fiber-reinforced matrix material having a lower fiber content, in particular a covering layer of C/SiC having a higher SiC content than in the interior region.

The invention likewise provides a process for producing such fiber-reinforced ceramic materials and also a process for producing shaped bodies comprising these materials.

The ceramic composites of the invention are preferably C/SiC ceramics comprising carbon fibers as reinforcing fibers and mainly phases of silicon carbide and silicon as matrix.

DETAILED DESCRIPTION OF THE PREFERRED EMBODIMENTS

In shaped bodies composed of the materials of the invention, a distinction can generally be made between a core zone and at least one covering layer which has been optimized in respect of its tribological properties. The covering layer typically has the function of a friction layer and possesses a higher SiC content than the core zone. The mass fraction of SiC in the covering or friction layer is preferably at least 1.1 times the mass fraction of SiC in the core zone.

The core zone comprises long fiber bundles, hanks or tows and C/SiC reinforced by short fibers or short fiber bundles. The fibers of different length are usually carbon-containing fibers, preferably carbon or graphite fibers. The sum of the mass fractions of both fibers in the core zone is preferably in the range from 20 to 90%, the mass fraction of SiC is preferably from 30 to 70% and the mass fraction of silicon is preferably from 0 to 30%. Here, the mass fraction for a particular component is, as is customary, defined as the ratio of the mass of this component to the mass of the mixture. In the covering layer, the mass fraction of fibers is typically from 0 to 35%, the mass fraction of silicon carbide is from 45 to 100% and the mass fraction of silicon is from 0 to 30%. The mass fraction of SiC in the covering layer is preferably at least 10% higher (i.e. at least 1.1 times) than that in the core zone, and the density of the covering layer is at least 5% higher than that of the core zone. It has been found that the desired tribological properties of the covering layer can be achieved in this way. However, it is also possible for core zone and covering layer to have virtually the same composition. In particular this is possible when the core zone itself has a relatively high SiC content.

For tribological applications such as friction disks, the thickness of the SiC-rich covering layer or friction layer is usually at least 0.1 mm, preferably at least 0.3 mm and particularly preferably at least 1 mm.

The appropriate production process provides for tows of long fibers to be coated with a composition comprising short fiber bundles and the coated and binder-containing fiber cables to be wound or laid in the preferential direction and the shaped body produced therefrom then to be cured and converted to ceramic material. In the case of the C/SiC materials, conversion to ceramic material is achieved by carbonization to give a porous C/C body and at least partial silicization of the matrix by infiltration with liquid silicon. The friction layer or its precursor material can be applied to the core body before hardening or before ceramicization (in the present case, before carbonization or before silicization).

For the present purposes, long fibers are fibers which have a mean length of at least 50 mm, preferably at least 75 mm and in particular at least 100 mm.

Short fibers are, for the present purposes, fibers which have a mean length of not more than 40 mm, preferably not more than 20 mm and in particular not more than 10 mm.

In the prior art described in the above-mentioned documents, discrete layers of long fibers which are located between an upper C/SiC layer and a lower C/SiC layer are produced, resulting in a sequence of long fiber-reinforced and unreinforced C/SiC in the direction perpendicular to the surface of the disk. In contrast, in the process of the invention, each fiber tow is completely surrounded by precursor material of the matrix, e.g. a C/SiC matrix, and the coated fiber tows are laid above one another or next to one another or wound. This avoids undesirable gradients in the long fiber content perpendicular or parallel to the surface of the disk.

The preferred process for producing the fiber-reinforced ceramic composites is liquid silicization of C/C intermediate bodies (also referred to as carbon fiber-reinforced carbon or CFC) to produce C/SiC.

Such processes for producing C/SiC composite bodies are known from, for example, DE-A 198 56 721, DE-C 197 11 829, DE-C 44 38 455 and DE-A 197 10 105.

These processes generally comprise the following steps:
1. Production of a mixture from carbon-containing long or short fibers, which may be collected in bundles or have been coated with a coating, and binders, for example resins and/or pitch, and also, if desired, further fillers;
2. Shaping and curing of these fiber-containing mixtures under pressure and/or at elevated temperature to produce a green body;
3. Carbonization or graphitization of the green body to produce a porous shaped body, in particular a shaped body comprising carbon fiber-reinforced carbon (CFC or C/C);
4. Infiltration of the porous shaped body with a silicon melt and at least partial reaction with the carbon to produce SiC so as to form a shaped C/SiC body.

In the process of the invention, the long fibers are coated with a short fiber bundle composition and rolled or laid in the selected direction as detailed below. The short fiber bundle composition is constituted so that after it has been silicized it forms a short fiber-reinforced C/SiC which encases the long fibers.

The long fibers are typically in the form of bundles, rovings or tows. It is advantageous if the individual filaments or the bundles are coated with carbonizable material or carbon. Other suitable long fiber materials are woven fabrics which have been cut into narrow strips, since this gives particularly good intermeshing between the individual filaments. Such long fibers will hereinafter be referred to collectively as fiber hanks.

The preferential main direction of the fiber hanks in the circumferential direction can be established in various ways with different geometric variants, of which a few preferred variants are described below. It is important that no kinks or bends having a small radius of curvature occur. The radius of curvature is preferably at least 5 mm, particularly preferably at least 10 mm.

Preferred embodiments for the selected direction of long fibers in shaped bodies composed of the materials of the invention are, for example:

a) the long fibers form a spiral concentric with the disk,
b) the long fibers form sequences of waves whose maxima and minima lie on concentric circles around the center of the circular disk,
c) the long fibers either form or circles with different radii alternating in any order with sequences of waves as described under b), both in each case concentric about the center point of the circular disk,
d) the long fibers form the outline of a stylized three-lobed, four-lobed or multilobed clover leaf,
e) the long fibers form a pentagon having rounded corners,
f) the long fibers form concentric circular tracks with epicycles.

Of course, it is also possible for a plurality of these arrangements to be combined in a shaped body, for example in different planes. In all cases, it is important that the long fibers are not kinked during laying of the arrangements; the radii of curvature are preferably at least five times, particularly preferably ten times and in particular fifty times, the fiber diameter of the individual fibers. If sharp angles are to be formed, preference is given to cutting the long fibers at these places and adhesively bonding them together to form the sharp angle. Likewise, the long fibers which form a concentric layer are preferably adhesively bonded at the place where they abut. Care is preferably taken to ensure that there is not more than one such place where fibers abut or are adhesively bonded within a sector of a circle having an opening angle of 5°, preferably within 10°.

In one embodiment of the type a), a long fiber tow which has been coated with short fiber bundle composition is wound up around a removable core. This gives a spiral arrangement of the long fibers in the plane of the disk. In this way, a disk or a flat cylinder is formed.

In other preferred variants, the coated fiber hanks are laid or braided in various geometric patterns so that the resulting alignment is preferentially oriented in the circumferential direction or in concentric circles around the center point of the disk-shaped body. Typical further examples of fiber alignment correspond to the embodiments b) to f). To lay the fiber hanks, removable domes are typically used. The height of the lay-up corresponds essentially to the thickness of the disk to be manufactured. To achieve the highest possible strength and stability at high rotational speeds, it is advantageous to fill the entire volume of the shaped body with the coated fiber hanks. Voids which remain are filled with the composition comprising short fibers. It is important for the arrangements that places where fibers abut do not occur within a narrow angular region of the disk, but are distributed as uniformly as possible over the circumference.

In all variants it is also possible to twist the fiber bundles or fiber hanks about their longitudinal axis beforehand, which results in better intermeshing of the reinforcing fibers.

The process of the invention also allows very high volume fractions of long fibers in the core zone to be achieved in a simple manner; these volume fractions can be above 50%. Although the reinforcing effect can be clearly seen at a volume fraction of at least 20% of long fibers in the core zone, very high volume fractions of up to 90% are aimed at for clutch disks in particular.

The shaped bodies manufactured in the manner described using the long fiber lay-ups, preferably in the form of disks, are thermally cured to produce green bodies. This is typically carried out in a heated press. If friction layers are to be applied to the outer surfaces of the disk, these are preferably introduced into the press during the pressing procedure in the form of appropriate short fiber bundle compositions or compositions comprising carbon material. However, it is likewise possible to produce the composition for the friction layer separately and to apply it only later to the green body or the carbonized green body.

Preference is given to using compositions comprising fiber bundles or short fiber bundle compositions for coating the fiber hanks. They are typically made up of short fiber bundles, binders and/or carbon material. The short fiber bundle compositions preferably consist almost entirely of short fibers coated with carbon-containing material, particularly preferably short fibers coated with carbon.

Short fiber bundle compositions are particularly preferably produced by comminution of carbon-coated fiber mats or fiber plaques which have typically been produced by single or repeated carbonization and impregnation with pitch and/or resins.

Adhesion of the short fiber bundle composition to the long fibers is ensured either by sticky binders on the long fibers or by sticky binders in the short fiber bundle composition.

For use as a friction disk, in particular a brake disk or particularly preferably a clutch disk, the shaped bodies are configured as disks which have a tribologically active outer surface on at least one of the flat sides. However, depending on the application principle, the other surfaces of the friction body, namely the (outer and inner) cylindrical surfaces, can be constituted as friction surfaces.

The fiber-reinforced ceramic composites of the invention can advantageously be used for producing clutch disks having high speeds of rotation, since the reinforcement according to the invention with long fibers or long fiber structures give them increased rates of rotation before rupture occurs.

What is claimed is:

1. A fiber-reinforced ceramic composite comprising bundles, tows or hanks of long fibers, wherein the long fiber bundles, tows or hanks are completely surrounded by a short fiber-reinforced matrix, the long fibers having a mean diameter of from 4 to 12 $\mu$m and a mean length of at least 50 mm and the short fibers a mean diameter of from 4 to 12 $\mu$m and having a mean length of not more than 40 mm.

2. The fiber-reinforced ceramic composite as claimed in claim 1, wherein the long fibers are carbon fibers and/or graphite fibers.

3. The fiber-reinforced ceramic composite as claimed in claim 1, wherein the short fibers are carbon fibers and/or graphite fibers.

4. The fiber-reinforced ceramic composite as claimed in claim 1, wherein the matrix comprises silicon carbide.

5. The fiber-reinforced ceramic composite as claimed in claim 1, wherein the matrix comprises metallic silicon.

6. The fiber-reinforced ceramic composite as claimed in claim 1, wherein the sum of the mass fractions of long and short fibers is in the range from 20 to 90%.

7. The fiber-reinforced ceramic composite as claimed in claim 4, wherein the mass fraction of SiC is from 30 to 70%.

8. The fiber-reinforced ceramic composite as claimed in claim 5, wherein the mass fraction of silicon is up to 30%.

9. A process for producing fiber-reinforced ceramic composites as claimed in claim 1, which comprises, in the first step, producing a mixture from carbon-containing long fibers, which may be collected in bundles and have been coated with a coating comprising a short fiber bundle composition, binders selected from among resins and pitch, and also, if desired, further fillers, pressing this mixture in a mold in the second step under pressure and/or at elevated temperature to produce a green body, carrying out carbonization and/or graphitization of the green body in the third step to produce a porous shaped body, in particular a shaped body comprising carbon fiber-reinforced carbon, and, in the fourth step, forming a shaped C/SiC body by infiltration of the porous shaped body with a silicon melt and at least partial reaction of the carbon with silicon to produce SiC, with the long fibers being wound or laid in a selected direction and the short fiber bundle composition being constituted so that after it has been silicized it forms a short fiber-reinforced C/SiC which surrounds the long fibers.

10. A method of use of fiber-reinforced ceramic composites as claimed in claim 1 comprising producing clutch disks or brake disks therefrom.

11. The method of claim 10, wherein the composites are brought to the shape of cylindrical disks or annular disks as core zone and they bear at least one covering layer of a short fiber-reinforced matrix material having a lower fiber content than the core zone.

12. The method of claim 11, wherein the covering layer has a higher SiC content than the core zone.

* * * * *